(12) United States Patent
Lin et al.

(10) Patent No.: US 8,248,521 B2
(45) Date of Patent: Aug. 21, 2012

(54) PORTABLE ELECTRONIC DEVICE WITH SLIDABLE IMAGE CAPTURING ASSEMBLY

(75) Inventors: Hou-Yao Lin, Taipei Hsien (TW); Sheng-Jung Yu, Taipei Hsien (TW); Hsin-Ho Lee, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 386 days.

(21) Appl. No.: 12/713,327

(22) Filed: Feb. 26, 2010

(65) Prior Publication Data

US 2011/0025908 A1 Feb. 3, 2011

(30) Foreign Application Priority Data

Jul. 29, 2009 (CN) .......................... 2009 1 0304941

(51) Int. Cl.
*H04N 5/225* (2006.01)
(52) U.S. Cl. ....................................... 348/373
(58) Field of Classification Search ............ 348/211.14, 348/222.1, 373–375
See application file for complete search history.

(56) References Cited

U.S. PATENT DOCUMENTS

| 7,194,290 B2 * | 3/2007 | Matsunami | 348/373 |
| 7,557,851 B2 * | 7/2009 | Ohashi et al. | 348/373 |
| 2002/0039134 A1 * | 4/2002 | Fukumoto et al. | 348/77 |

* cited by examiner

*Primary Examiner* — Gevell Selby
(74) *Attorney, Agent, or Firm* — Altis Law Group, Inc.

(57) ABSTRACT

A portable electronic device includes a shell, an image capturing assembly, a signal processing circuit, and a connection plate. The shell defines a first annular shaped guiding slot. The image capturing assembly includes a camera module. The camera module includes a substrate and a flexible circuit board (FPC). The FPC has one end connected to the substrate and another end electrically coupled to the signal processing circuit. The connection plate includes a first plate positioned on the shell and a second plate perpendicular to the first plate. A second guiding slot is defined on the second plate and aligned with the first guiding slot on the shell. The connection plate, the shell, the first and second annular guiding slots cooperatively define a laid-down T-shaped receiving groove, the image capturing assembly is received in the T-shaped groove and is slidable along the T-shaped groove.

14 Claims, 4 Drawing Sheets

PORTABLE ELECTRONIC DEVICE WITH SLIDABLE IMAGE CAPTURING ASSEMBLY

BACKGROUND

1. Technical Field

The present disclosure relates to a portable electronic device, and, particularly, to a portable electronic device with a rotatable image capturing assembly.

2. Description of the Related Art

Due to advances in micro-circuitry and multimedia technology, camera modules are now in wide use. Portable electronic devices, such as mobile phones and personal digital assistants, are increasingly featuring multi-functional capabilities. Several come equipped with camera modules.

Camera module is typically positioned in a fixed location, for example, fixedly mounted on the back of a portable electronic device sacrificing flexibility, and the shooting angle of single camera module is very small. Furthermore, if user want to have delay-timer shooting function and want to view the shooting image on the LCD of the portable electronic device in real time, installation of two camera modules respectively, at the rear and front of the portable electronic device, is required, which is costly.

Therefore, it is desirable to provide a portable electronic device which can overcome the above-mentioned problems.

BRIEF DESCRIPTION OF THE DRAWINGS

Many aspects of the present portable electronic device could be better understood with reference to the accompanying drawings. The components in the drawings are not necessarily drawn to scale, the emphasis instead being placed upon clearly illustrating the principles of the portable electronic device. Moreover, in the drawings, like reference numerals designate corresponding parts throughout the several views.

DETAILED DESCRIPTION

Embodiments of the present portable electronic device will now be described in detail below, and with reference to the drawings.

Figure 1:
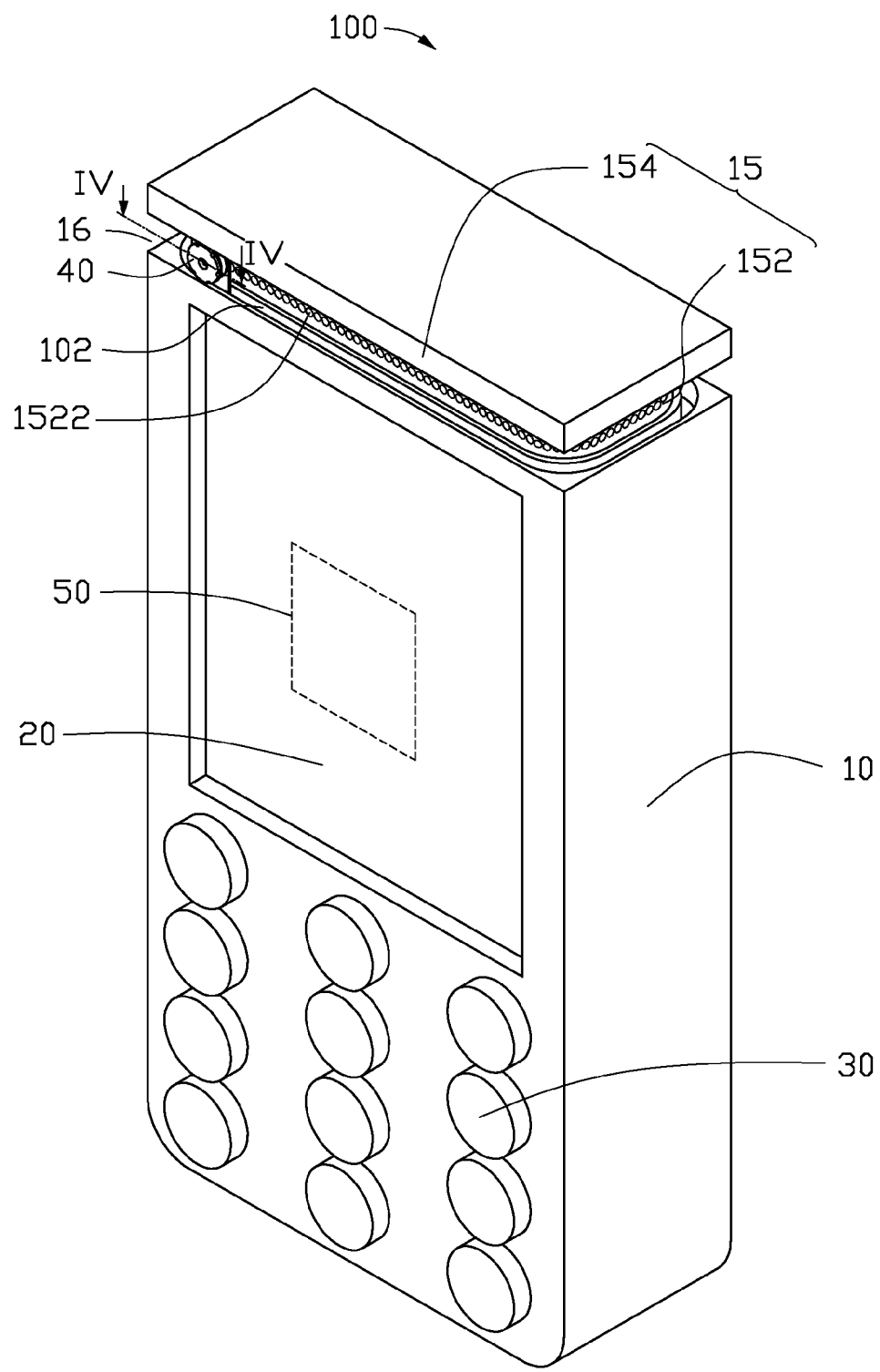
FIG. 1 is an assembled, isometric view of a portable electronic device which includes an image capturing assembly, according to an exemplary embodiment.
Figure 2:
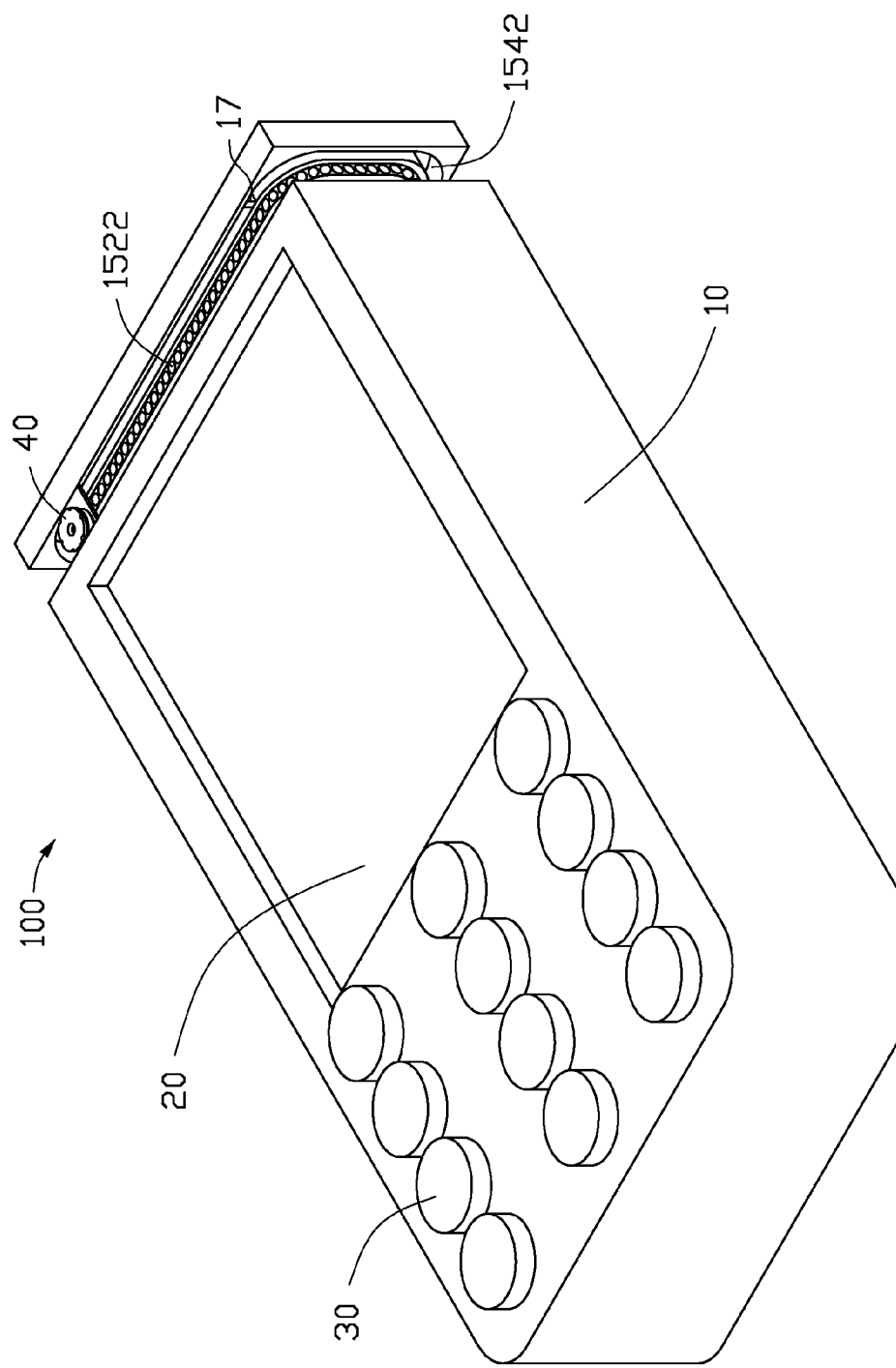
FIG. 2 is an assembled, isometric view of the portable electronic device of FIG. 1, viewed from another angle.
Figure 3:
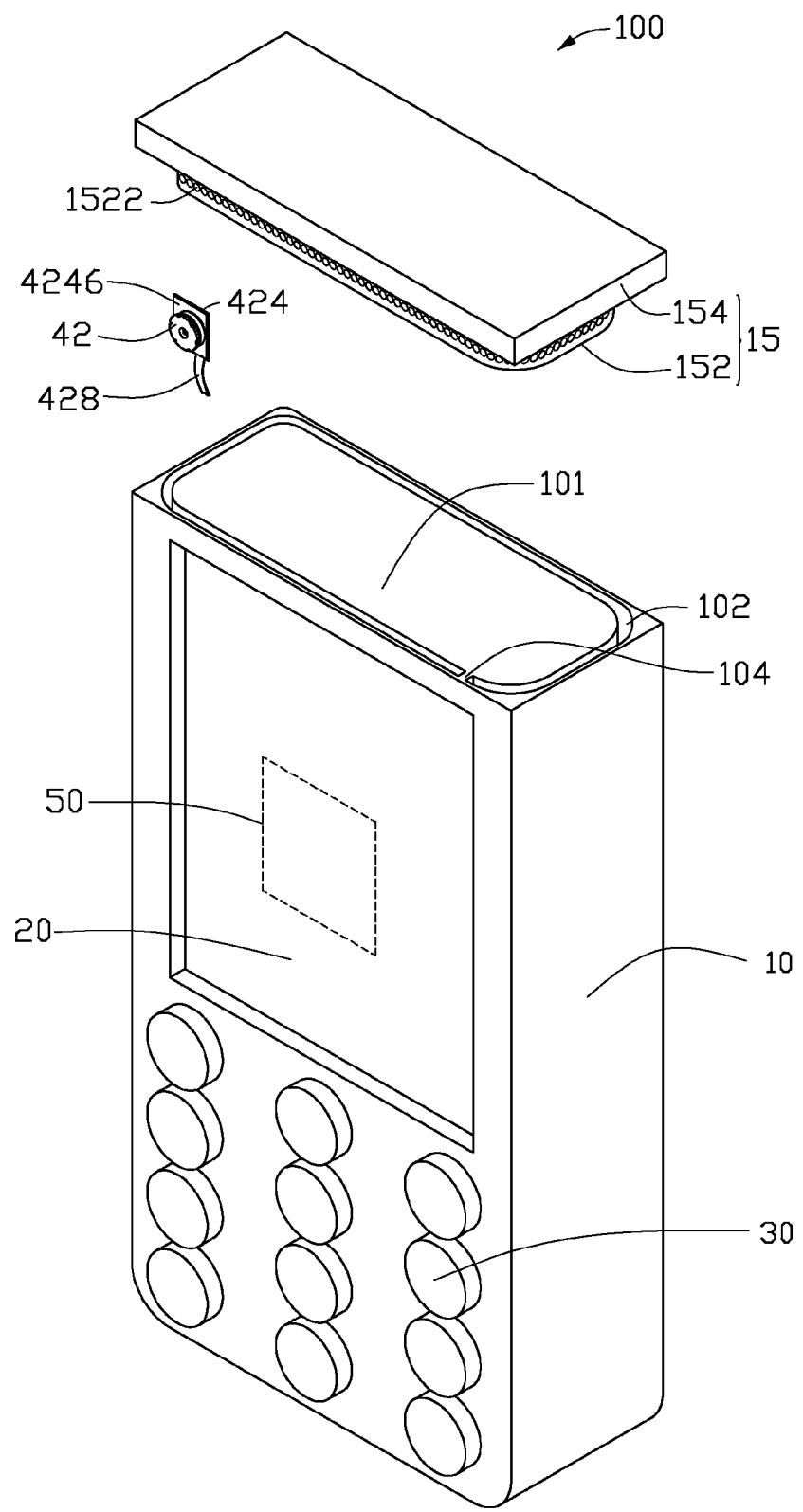
FIG. 3 is an exploded, isometric view of the portable electronic device of FIG. 1.

Referring to FIGS. 1-3, a portable electronic device 100 in accordance with an exemplary embodiment is illustrated. The portable electronic device 100 may be a mobile phone, a laptop, or a personal digital assistant. In this embodiment, the portable electronic device 100 is a mobile phone. The portable electronic device 100 includes a hollow shell 10, a display screen 20, a keypad 30, an image capturing assembly 40, and a signal procession circuit 50.

The display screen 20 and the keypad 30 are assembled in the outer surface of the shell 10. In this embodiment, the display screen 20 and the keypad 30 are adjacent to each other.

The shell 10 includes a top portion 101 (i.e., a head portion), the top portion 101 defines a first annular guiding slot 102 therein. The signal procession circuit 50 is mounted within the shell 10.

Figure 4:
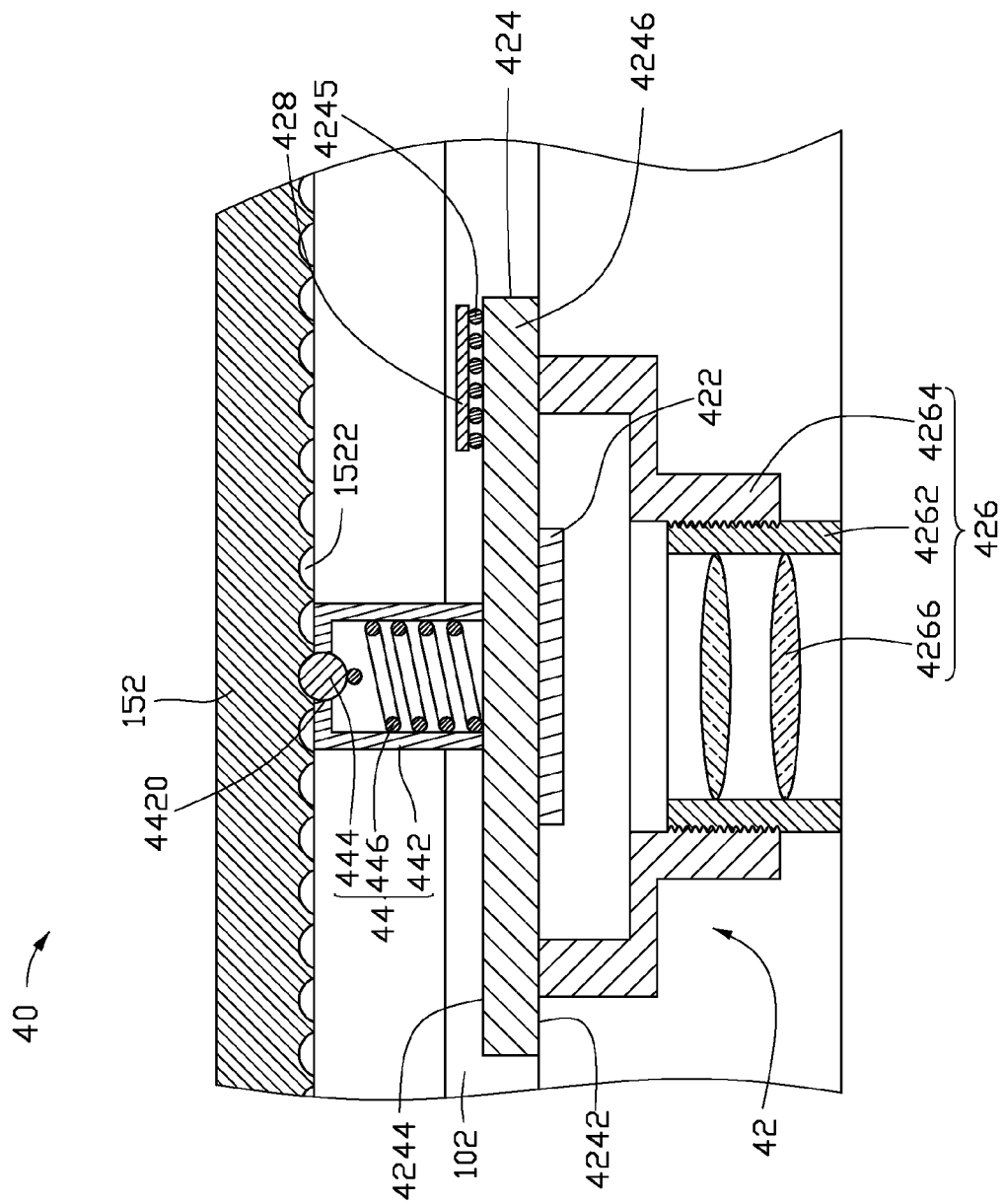
FIG. 4 is a cross-sectional view taken along line IV-IV of FIG. 1.

Also referring to FIG. 4, the portable electronic device 100 further includes a T-shaped connection plate 15 affixed on the top portion 101. The connecting plate 15 includes a first plate 152 and a second plate 154 perpendicular to the first plate 152. The first plate 152 is disposed on the top portion 101. A number of position holes 1522 are defined along a periphery of the first plate 152. A second annular guiding slot 1542 is defined on the second plate 154 and aligned with the first annular guiding slot 102. The connecting plate 15, the top portion 101 of the shell 10, the first annular guiding slot 102, and the second annular guiding slot 1542 cooperatively form a laid-down T-shaped groove 16. The image capturing assembly 40 is received in the T-shaped groove 16 and is slidable along the first annular guiding slot 102 and the second annular guiding slot 1542.

A first block 104 is positioned in the first annular guiding slot 102. A second block 17 is positioned in the second annular guiding slot 1542 and aligned with the first block 104. In this embodiment, the first block 104 and second block 17 are configured for limiting the sliding range of the image capturing assembly 40.

The camera module 42 includes an image sensor chip 422, a substrate 424, a lens module 426, and a flexible print circuit (FPC) 428.

The image sensor chip 422 is a charged coupled device (CCD), or a complementary metal-oxide-semiconductor transistor (CMOS). The image sensor chip 422 is configured to convert light signals received from the lens module 426 into digital electrical signals.

The substrate 424 consists of such materials as polyimide, ceramic, or glass fiber. The substrate 424 includes a supporting surface 4242 and a bottom surface 4244 facing away from the supporting surface 4242. The supporting surface 4242 is configured for engaging with the image sensor chip 422 and the lens module 426. The image sensor chip 422 is electrically mounted on the substrate 424. A number of bonding pads 4245 are disposed on the bottom surface 4244 of the substrate 424, the bonding pads 4245 are mechanically and electrically coupled to one end of the FPC 428 via a type of anisotropic conductive adhesive (ACA). The other end of the FPC 428 is electrically connected to the signal procession circuit 50 for processing images captured by the camera module 42.

The lens module 426 aligns with the image sensor chip 422, and includes a lens barrel 4262, a lens holder 4264 and a lens assembly 4266 received in the lens barrel 4262. The lens barrel 4262 is partially received in and engaged with the lens holder 4264. The lens holder 4264 is adhered to the supporting surface 4242 of the substrate 424 and receives the image sensor chip 422. In this embodiment, the substrate 424 is larger than the lens holder 4264. Two opposite peripheries 4246 of the substrate 424 are correspondingly received in the first annular guiding slot 102 and the second annular guiding slot 1542, and the lens module 426 appears to users via the laid-down T-shaped groove 16.

The biasing device 44 includes a hollow frame 442, a ball 444, and a spring 446. The frame 442 is disposed on the bottom surface 4244 of the substrate 442. In this embodiment, the frame 442 is made of elastic material. One end of the frame 442 away from the substrate 424 defines an opening 4420. In this embodiment, the opening 4420 is circular in shape, and the diameter of the opening 4420 is slightly less than that of the ball 444. The ball 444 and the spring 446 are received in the frame 442. The spring 446 urges against the ball 444, the ball 444 partially protrudes from the opening 4420 to the first plate 152.

In use, the image capturing assembly 40 can be slid by users in the T-shape groove 16. When users stop sliding the image capturing assembly 40, the ball 444 of the biasing device 44 is engagingly received in a position hole 1522 under the biasing force of the spring 446, which prevents the image capturing assembly 40 from sliding away automatically.

It will be understood that the above particular embodiments and methods are shown and described by way of illustration only. The principles and the features of the present invention may be employed in various and numerous embodiments thereof without departing from the scope of the invention as claimed. The above-described embodiments illustrate the scope of the invention but do not restrict the scope of the invention.

What is claimed is:

1. A portable electronic device comprising:
   a shell defining a first annular guiding slot;
   a signal processing circuit mounted within the shell;
   an image capturing assembly comprising a camera module, wherein, the camera module comprises an image sensor, a substrate, a lens module, and a flexible circuit board (FPC), the image sensor is electrically mounted on the substrate, the lens module is disposed on the substrate, the FPC has one end electrically connected to the substrate and another end electrically coupled to the signal processing circuit for processing images captured by the image sensor; and
   a connection plate comprising a first plate positioned on the shell and a second plate perpendicular to the first plate, wherein, a second guiding slot is defined in the second plate and aligned with the first guiding slot on the shell, the connection plate, the shell, the first and second annular guiding slots cooperatively define a T-shaped receiving groove, the image capturing assembly is received in the T-shaped groove and is slidable along the T-shaped groove.

2. The portable electronic device as claimed in claim 1, wherein the substrate is larger than the lens holder, two opposite peripheries of the substrate are respectively received in the first and second annular guiding slots.

3. The portable electronic device as claimed in claim 1, further comprising a biasing device, wherein the biasing device comprises a hollow frame, a ball, and a spring, the frame is disposed on a bottom surface of the substrate, one end of the frame away from the substrate defines an opening, the ball and the spring are received in the frame, the spring urges against the ball, the ball partially protrudes from the opening to the first plate.

4. The portable electronic device as claimed in claim 3, wherein a plurality of positioning holes are defined along a periphery of the first plate, and the ball is engagingly received in one of the position holes under the biasing force of the spring.

5. The portable electronic device as claimed in claim 4, wherein the opening is circular in shape, and the diameter of the opening is less than that of the ball.

6. The portable electronic device as claimed in claim 3, wherein the frame is made of elastic material.

7. The portable electronic device as claimed in claim 1, wherein a number of bonding pads are disposed on the bottom surface of the substrate, the bonding pads are mechanically and electrically coupled to one end of the FPC.

8. The portable electronic device as claimed in claim 7, wherein the bonding pads are mechanically and electrically coupled to the end of the FPC via an anisotropic conductive adhesive.

9. The portable electronic device as claimed in claim 1, wherein the shell includes a top portion and a display screen adjacent to the top portion, and the first annular slot is defined in the top portion.

10. The portable electronic device as claimed in claim 1, wherein the lens module is aligned with the image sensor chip, the lens module comprise a lens barrel, a lens holder and a lens assembly received in the lens barrel, the lens barrel is partially received in and engaged with the lens holder.

11. The portable electronic device as claimed in claim 1, further comprising a display screen and a keypad, wherein the display screen and the keypad are adjacent to each other.

12. The portable electronic device as claimed in claim 1, wherein a first block is positioned in the first annular guiding slot and configured for limiting the sliding range of the image capturing assembly.

13. The portable electronic device as claimed in claim 12, wherein a second block is positioned in the second annular guiding slot, the second block is aligned with the first block.

14. The portable electronic device as claimed in claim 1, wherein the connecting plate is T-shaped.

* * * * *